(12) United States Patent
Pearson

(10) Patent No.: US 11,436,317 B2
(45) Date of Patent: Sep. 6, 2022

(54) SYSTEMS AND METHODS FOR ASSURING INTEGRITY OF OPERATING SYSTEM AND SOFTWARE COMPONENTS AT RUNTIME

(71) Applicant: Raptor Engineering, LLC, Belvidere, IL (US)

(72) Inventor: Timothy Raymond Pearson, Boone, IL (US)

(73) Assignee: Raptor Engineering LLC, Poplar Grove, IL (US)

( * ) Notice: Subject to any disclaimer, the term of this patent is extended or adjusted under 35 U.S.C. 154(b) by 304 days.

(21) Appl. No.: 15/899,460

(22) Filed: Feb. 20, 2018

(65) Prior Publication Data

US 2018/0239895 A1 Aug. 23, 2018

Related U.S. Application Data

(60) Provisional application No. 62/461,424, filed on Feb. 21, 2017.

(51) Int. Cl.
*G06F 21/52* (2013.01)
*G06F 21/64* (2013.01)
*G06F 21/81* (2013.01)

(52) U.S. Cl.
CPC .............. *G06F 21/52* (2013.01); *G06F 21/64* (2013.01); *G06F 21/81* (2013.01); *G06F 2221/033* (2013.01)

(58) Field of Classification Search
CPC .......... G06F 21/52; G06F 21/81; G06F 21/64; G06F 2221/033
See application file for complete search history.

(56) References Cited

U.S. PATENT DOCUMENTS

| | | | | |
|---|---|---|---|---|
| 3,827,029 A | * | 7/1974 | Schlotterer | G06F 12/1441 711/163 |
| 8,510,596 B1 | * | 8/2013 | Gupta | G06F 11/073 714/15 |
| 2007/0261120 A1 | * | 11/2007 | Arbaugh | G06F 21/57 726/26 |
| 2008/0015808 A1 | * | 1/2008 | Wilson | G06F 21/51 702/123 |
| 2009/0172639 A1 | * | 7/2009 | Natu | G06F 21/57 717/120 |
| 2011/0022837 A1 | * | 1/2011 | Stevens | H04L 63/0823 713/155 |
| 2011/0191850 A1 | * | 8/2011 | Turbin | G06F 11/00 726/24 |
| 2012/0079287 A1 | * | 3/2012 | Leclercq | G06F 21/575 713/192 |
| 2013/0124845 A1 | * | 5/2013 | Wang | G06F 21/554 713/2 |

(Continued)

*Primary Examiner* — Carl G Colin
*Assistant Examiner* — Hany S. Gadalla
(74) *Attorney, Agent, or Firm* — Pierson IP, PLLC

(57) ABSTRACT

Examples of the present disclosure are related to systems and methods for assuring integrity of operating system and software components at runtime. More specifically, embodiments are directed towards a hardware module configured to monitor a kernel start and drivers being loaded into the kernel, and to continually scan the kernel and drivers for undesired modification after load. Further embodiments extend the monitoring capability to userspace processes.

9 Claims, 4 Drawing Sheets

(56) References Cited

U.S. PATENT DOCUMENTS

| | | | |
|---|---|---|---|
| 2013/0227262 A1* | 8/2013 | Maya | G06F 21/575 |
| | | | 713/2 |
| 2013/0333040 A1* | 12/2013 | Diehl | H04L 63/1491 |
| | | | 726/24 |
| 2015/0019793 A1* | 1/2015 | Dover | G06F 21/57 |
| | | | 711/103 |
| 2015/0220736 A1* | 8/2015 | Martinez | G06F 13/24 |
| | | | 711/163 |
| 2015/0264077 A1* | 9/2015 | Berger | G06F 21/52 |
| | | | 726/23 |
| 2016/0196083 A1* | 7/2016 | Cho | H04L 63/145 |
| | | | 711/163 |
| 2016/0232354 A1* | 8/2016 | Fraser | G06F 21/554 |
| 2017/0161483 A1* | 6/2017 | Li | G06F 21/572 |
| 2018/0114024 A1* | 4/2018 | Dasari | G06F 21/572 |

* cited by examiner

SYSTEMS AND METHODS FOR ASSURING INTEGRITY OF OPERATING SYSTEM AND SOFTWARE COMPONENTS AT RUNTIME

CROSS-REFERENCE TO RELATED APPLICATIONS

This application claims a benefit of priority under 35 U.S.C. § 119 to Provisional Application No. 62/461,424 filed on 21 Feb. 2017, which is fully incorporated herein by reference in its entirety.

BACKGROUND INFORMATION

Field of the Disclosure

Examples of the present disclosure are related to systems and methods for assuring integrity of operating systems and software components at runtime. More specifically, embodiments are directed towards an independent and remotely positioned hardware module configured to monitor a kernel start and drivers being loaded into the kernel, and verify cryptographic signing keys of both the kernel and the modules.

Background

A kernel is a computer program that is the core of a computer's operating system. Typically the kernel is the first program that is loaded on start-up, and handles the start-up, input/output requests from software, loading drivers, memory allocations, etc. The kernel is typically loaded into a protected area of memory, which prevents it from being overwritten by applications or malicious code. Kernel modules are segments of code run in the kernel or by the kernel, typically at the kernel privilege level, should also be verified. Such kernel modules may be variously referred to in industry without limitation as device drivers, loadable modules, kernel extensions, and/or kernel loadable modules.

To ensure that the kernel is not affected by malicious activity, mutations of critical programs at runtime and mutations of critical programs stored on persistent storage are generally detected by virus scanning programs. These virus scanning programs operate on a series of virus definition files. In use, once a new virus is detected, a virus definition file is updated to counter the new virus and/or variants of the new virus.

To this end, virus scanners need to initially be made aware of malicious code to update the virus definition file. Thus, conventional virus scanners cannot initially protect against new types of viruses at runtime. Furthermore, if the virus scanner is affected by malicious code, the virus definition file can be rendered useless.

Accordingly, needs exist for more effective and efficient systems and methods assuring integrity of operating system and software components at runtime without having to rely on virus definition files.

SUMMARY

Examples of the present disclosure are related to systems and methods for assuring integrity of operating system and software components at runtime. Embodiments may be configured to detect modifications to critical operating system components, code, and userspace utilities at startup or during runtime. Embodiments may detect the modifications via an independent hardware module that is configured to verify cryptographic signatures of kernels and loaded modules upon startup or at runtime. Embodiments may rely on the operating system and critical software components not using self-modifying code, which may change drivers and keys associated with the kernel. Embodiments may be configured to determine if there are any mutations to the kernel or modules in the host RAM after loading and initial cryptographic checks are complete.

Embodiments may include a hardware module with full read-only access to system memory. The hardware module may also be a separate and independent hardware element from the system RAM, memory controllers, CPU, etc. However, in other embodiments, the hardware module may be located at the same physical location, housing, chip, etc. as the systems RAM, memory controllers, CPU, etc. The hardware module monitors data associated with the operating system expected used by the computing platform (referred to hereinafter as "host") at runtime. In embodiments, the hardware module may be coupled via wires and/or fibres to a plurality of computing resources, such as servers, racks, etc., that are physically located in the same location. Utilizing such a configuration, the hardware module may determine if there are any mutations at runtime or startup for each of the plurality of computing resources, wherein the determinations may occur at independent and distinct times.

Embodiments of the hardware module may monitor activities associated with a kernel(s) associated with the operating system(s) immediately following boot firmware execution. The hardware module may track any and all kernels, kernel modules, drivers, etc. (referred to hereinafter collectively and individually as "modules") being loaded into the kernel along with signed cryptographic keys of both the kernel and the loaded modules. In further embodiments, the hardware module may track any and all userspace processes loaded into userspace memory along with the signed cryptographic keys associated with the userspace memory. In embodiments, the modules and the userspace processes may be collectively or individually may be referred to as "system data." In implementations system data may refer to any executable code, processes, or and binary functionality.

Embodiments of the hardware module may include hashes of cryptographic signatures associated with loading or loaded modules, wherein the hardware module locally stores the hashes in persistent memory before startup. Utilizing the hashes of the cryptograph signatures of the modules, the hardware module continually scans the host RAM for loaded modules into the kernel, and verify that the cryptographic signatures of the kernel and loaded modules are valid by comparing the stored hashes with the cryptographic signatures. For example, the hardware module may run public key checks to validate the cryptographic signatures. In implementations, the hardware module may be configured to verify the cryptographic signatures once the modules are loaded into the kernel, and a simple collision-resistant hashing algorithm would be used to verify that the host RAM has not changed. This may reduce the processing power necessary to verify the loaded modules, while still implementing cryptographic signature verifications.

The hardware module may include data, such as addresses of modules to be loaded into the kernel or userspace, and scan only data associated with the loaded modules. Therefore, the hardware module may not scan all of the system RAM, but only specific areas associated with loaded modules. This may increase the speed and reduce the processing power required by the hardware module to validate modules being loaded into the kernel at runtime. In a first mode, the hardware module may be configured to always verify that the cryptographic signatures of the kernel and loaded modules are valid, and verify that the host RAM has not changed.

Responsive to determining a change to the kernel, module, or loaded modules based on a change to the cryptographic signatures or current hash values, a security violation may be detected. Upon detecting the security violation, a reset line of the host may be immediately asserted, followed by a host power down, and the presence of the security violation can be made known to the system operator by common technical means. For example, the security violation may be known via an error light, SNMP message, IPMI alert, or any other means of communicating an error message. In embodiments, the hardware module may continue to hold the host in reset or otherwise prevent the host's CPU execution until the security violation is expressly acknowledged by a side channel means or by the system operator taking actions to remove the reset. Therefore, the security violation flag may not be inadvertently cleared by attempting to power cycle or power-on the host via the normal sequences used to locally and/or remotely control the host.

In embodiments, the hardware module may be made responsive to a write-once immutability flag, where said flag may only be cleared by actions that restart the host's CPU execution from initial conditions, such as a chassis reset, power cycle, or reboot. Responsive to the immutability flag being set, the hardware module may be configured to assert a security violation if any kernel component and/or module is modified, regardless of whether the altered hash values or cryptographic signatures would otherwise be valid.

In embodiments, the hardware module may continue to hold the host in reset or otherwise prevent the host's CPU execution until the security violation is expressly acknowledged by a side channel means or by the system operator taking actions to remove the reset. Therefore, the security violation flag may not be inadvertently cleared by attempting to power cycle or power-on the host via the normal sequences used to locally and/or remotely control the host.

In a second mode of operation, the hardware module may not be configured to perform the initial cryptographically signature checks. The hardware module may monitor the modules loaded into the kernels, waiting for the host to set an immutability flag. After the immutability flag has been set, the hardware module may consider any change to the kernel, modules, or loaded modules to be a security violation. When the immutability flag is set, the hardware module may automatically compute the hashes of the current contents loaded into the kernel. These hashes may be used as golden hashes when operating in the second mode. Any deviation from the golden hashes computed when the immutability flag was set will then assert a security violation. The flag set by the immutability request may be cleared only by a host reboot or other means of restarting CPU execution from initial conditions. Therefore, if the hardware module determined that a loaded module onto the kernel has mutated the kernel after the initial cryptographic checks are complete by the kernel, the hardware module may assert a security violation.

In embodiments, the hardware module may not be network enabled, and may only be updated by direct physical contact with a powered down host and/or device pair. Alternatively, the hardware module may be network enabled via a dedicated network connection, which may be independent of and not shared with the host, and can only be updated if the host is powered down or held in reset by hardware.

In further implementations, the hardware module may be utilized to monitor userspace processes and applications signatures in a similar manner. Four security violation flags may be enabled, a first flag may be configured to set a security violation if new processes of any type are spawned, and a second flag to set a security violation if a new program that does not match the hash of an already executing program is spawned. A third flag will set a security violation if a newly spawned program does not match an entry on the whitelist, where checks may occur based on cryptographic signature or collision resistant hash depending on module configuration. A fourth flag is the immutability request for userspace. Responsive to the userspace immutability flag being set, the module will assert a security violation if any currently executing userspace programs are modified in any way. Any set flags may only be cleared by a host reboot.

Further embodiments may include a whitelist loaded onto the hardware module. The whitelist may depend on whether a kernel whitelist flag, userspace whitelist flag, or some combination is set. Security violations associated with data on the whitelist may not set a violation flag, however security violations may be flagged for any program(s), kernel, or kernel module(s) that begin execution that are not located within the associated whitelist(s).

To this end, embodiments may reduce the likelihood of zero-day attacks that rely on modification of running programs, kernels, or kernel modules on the host system. Embodiments may restrict access to sensitive data by automatically and forcibly terminating malicious code, and flagging the malicious code to a system operator.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
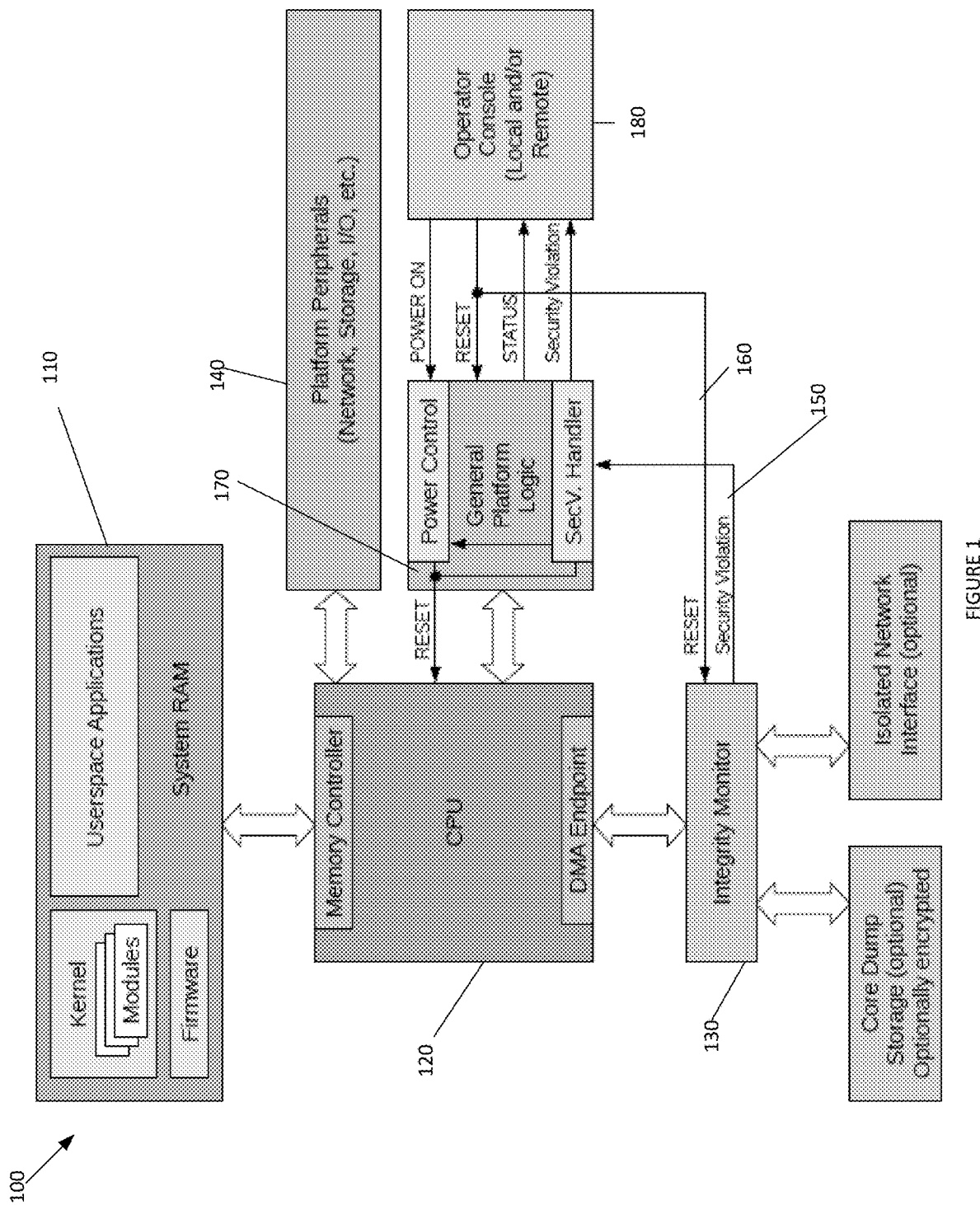
FIG. 1 depicts a topology for a system configured to ensure the integrity of an operating system and related critical software components at runtime, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Turning now to FIG. 1, FIG. 1 depicts a topology for a system 100 configured to ensure the integrity of an operating system and related critical software components at runtime, according to an embodiment. System 100 may be configured to minimize zero-day malicious activity, wherein system 100 may reduce attacks without knowing the effects of malicious code. Therefore, system 100 may be protected against situations where code within program allows an attacker to access a system, modify data, and leave the system without being detected.

System 100 may include critical applications 110, Host 120, hardware module 130, platform peripherals 140, general platform logic 170, and operator console 180.

Critical applications 110 may include kernels, modules configured to be loaded within the kernels, firmware, and userspace applications, which may be executed on system RAM. System random access memory (RAM) may be any mutable medium in which application code and/or data may be stored for direct access during execution, including DRAM, NVRAM, MRAM, or Flash. The kernel may be a computer program that is the core of Host 120's operating system, which may have control over the software associated with Host 120. In implementations, critical applications 110 may include kernels associated with multiple CPU's for different hosts 120. The kernel may be a runtime system that is the first program run responsive to system 100 start-up or initiation. Additionally, the kernel may handle the start-up procedure including input/output requests associated with software, kernel space for modules, firmware, and userspace applications, translating the requests into data-processing instructions for Host 120. Furthermore, critical applications 110 may be stored on random access memory (RAM) or any mutable medium in which application code and/or data may be stored for direct access during execution, including DRAM, NVRAM, MRAM, or Flash, in a hardware location that is remote from Host 120 and hardware module 130. For example, critical applications 110 may be a Linux kernel, with firmware images, modules, userspace applications, which may include corresponding cryptographic signatures, public keys, and private keys. To execute modules, images, userspace applications, etc., it may be necessary to communicate the corresponding signatures and keys to Host 120, wherein the executed programs and associated data may be validated by hardware module 130.

Host 120 may be a central processing unit with electronic circuitry within system 100 that carries out the instructions of a computer program by performing operations based on the instructions. Host 120 may include a memory controller and a Direct Memory Access (DMA) endpoint.

The memory controller may be a digital circuit that manages the flow of data going to and from host's 120 main memory. The memory controller may be a separate chip or integrated into another chip, such as being placed on the same board as a microprocessor. Responsive to critical applications 110 being initiated, the memory controller may receive data associated with the executed programs, such as the cryptographic signatures and keys at real time. This data may be parsed by hardware module 130

DMA endpoint may be a portion of host 120 that is configured to allow certain hardware subsystems to access main system memory, such as system RAM, independent of Host 120. For example, the DMA endpoint may be configured to allow hardware module 130 to parse or receive data received by the memory controller. The data communicated between the DMA endpoint and hardware module 130 may include data associated with critical applications 110 being initiated at runtime and their corresponding signatures and keys. Other critical data may include parts of or all of the executable code of the critical applications and supporting software. Examples of suitable DMA endpoints include, but are not limited to, IBM's CAPI interface.

Hardware module 130 may be an integrity monitor that is configured to monitor data associated with critical software 110 being executed immediately following boot firmware execution. For example, hardware module 130 may be configured to monitor and record any and all drivers, modules, userspace applications being loaded into the kernel. Hardware module 130 may be an independent and isolated hardware element that has no write access and no network access, and is remotely located from host 120. Therefore, data stored on or parsed by hardware module 130 may not be remotely modified.

In embodiments, hardware module 130 may include memory that is configured to store validity data. The validity data may be associated with the kernel and the modules, and include data such as address data, key pair data, and signature data (i.e. hashes and/or cryptographic public keys for the loaded kernels and modules). The validity data may be stored before startup of host 120, and before the system data is loaded into host 120.

The validity data may also include unique identifiers that may correspond to a name associated with the system data. Hardware module 130 may be configured to monitor loaded system data on host 120, and determine if there are any mutations to the kernel, modules, or system data in the RAM after they are loaded by comparing the loaded system data with validity data associated with the executable code, system data, kernels, and/or modules stored locally on the hardware module.

Furthermore, hardware module 130 may be configured to continually scan the host memory with the loaded system data, verify that cryptographic signatures of the kernel and loaded modules are valid, and/or monitor the system data, kernel, and/or loaded modules via hashing algorithms to verify that the RAM has not changed. For example, hardware module 130 may compare the unique identifiers associated with system data, determine if there is stored validity data with a unique identifier corresponding to the loaded system data, determine a stored hash associated with the unique identifier, and compare the stored hash with a hash associated with the loaded system data. If the stored hash associated with the unique identifier matches the hash associated with the loaded system data then hardware module 130 may determine that there are no mutations to the loaded system data.

In other embodiments, hardware module 130 may be configured to perform a hashing algorithm based on a cryptographic signature for the loaded data to determine a public key associated with the cryptographic signature for the loaded system data. Hardware module 130 may determine if the stored public key within the validity data matches the determined public key associated with the cryptographic signature. If the stored public key within the validity data matches the determined public key associated with the cryptographic signature for the loaded system data, hardware module 130 may determine that there are no mutations to the loaded system data.

For example, hardware module 130 may validate the cryptographic signatures of the kernel and loaded modules after load by validating cryptographic signatures and keys associated with the kernel and/or loaded modules against the data stored on hardware module 130.

As such, hardware module 130 may determine when modules are loaded into the kernel, determine the load address associated with the module, wherein the address is generated by the kernel before loading the module. The corresponding signatures of the data associated with the modules loaded into the addresses may be verified by validating the cryptographic signatures stored on hardware module 130 against the module data loaded into the address to determine if the cryptographic signatures correspond with stored data, and set a security violation flag if the corresponding signatures are not valid (i.e. do not correspond with or match the stored data) after being loaded into RAM. Therefore, hardware module 130 may be configured to monitor or scan all the memory, hashes, and images, associated with a kernel or other critical software, without resorting to a brute force scan of all system memory, Furthermore, collision-resistant hashing algorithms may be utilized to determine that the monitored RAM contents have not changed. This may drastically reduce the processing power and time necessary to determine if malicious activity has affected the boot and/or runtime processes of host 120, which may occur directly after the load process.

In embodiments, hardware module 130 may be communicatively coupled with encrypted storage and/or an isolated network interface. The encrypted storage may be configured to store encrypted data, which may include information associated with the whitelists, key pairs, hashes of cryptographic signatures, and cryptographic signatures. The whitelists may include data associated with kernels, userspace applications, or any other critical applications 110. Responsive to hardware module 130 receiving data such as a cryptographic signature or key associated with a program not located with an associated whitelist, hardware module 130 may be configured to transmit data to indicate a security violation has occurred. This may limit or reduce the amount of new programs that can be executed on host 120.

The isolated network interface may be configured to allow hardware module 130 to be updated if Host 120 is powered down or held in reset.

Platform peripherals 140 may be any ancillary device that is used to communicate information with host 120. For example, platform peripherals 140 may include network communication devices, storage devices, keyboards, monitors, mouse, speaker, microphone, camera, and/or any other device that is configured to input data to host 120 or receive data from host 120.

General platform logic 170 may be a control bus configured to communicate with other devices within system 100. For example, general platform logic 170 may be configured to communicate with host 120, hardware module 130, and/or operator console 180. General platform logic 170 may include data transfer lines to HOST 120 that are configured to reset host 120 via a hard power down or hard CPU reset. Furthermore, general platform logic 170 may include data transfer lines that are configured to receive a power on request from operator console 180, a reset request from operator console 180, transfer status to operator console 180, and receive data associated with security violations from integrity monitor 130, and transmit data associated with security violations to operator console 180.

In embodiments, responsive to general platform logic 170 receiving data associated with a security violation from hardware module 130, general platform logic 170 may assert a reset line for host 120, and host 120 may be powered down and/or rendered inoperable. In embodiments, general platform logic 170 may be configured to hold host 120 in reset or otherwise rendered inoperable until the security violation is expressly acknowledged by operator console 180. Therefore, the security violation flag may not be cleared by attempting to power cycle or power on the host via normal sequences. Furthermore, responsive to receiving the data associated with the security violation, general platform logic 170 may transmit data to operator console 180 associated with the security violation.

Operator console 180 may be a local and/or remote computing device that is operated by a system administrator. Operator console 180 may include computer with a display, user interface, communication device, wherein operator console 180 is configured to receive status data and security violation data from general platform logic 170. Furthermore, when receiving data associated with the security violation, the security violation may be made known to a system operator via common technical means, such as an error light, SNMP message, IPMI event, and/or any other method. Operator console 180 may also be configured to transfer data over a power control line to general platform logic, wherein responsive to transfer data over the power control line, host 120 may be powered on or off. Operator console 180 may also be configured to transfer reset data over a reset line to general platform logic 170 and/or hardware module 170. In embodiments, to clear the security violation flag set by hardware module 130, operator console 180 may transmit a reset command to general platform logic 170 and/or hardware module 130. In embodiments, operator console 180 may consist of a user interface, indicators, and buttons physically located on system 100.

In further embodiments, the hardware module 130 may not be configured to perform the initial cryptographic signature checks on all of the kernels loaded into the modules. The hardware module 130 may continually monitor the modules loaded into the kernels, but ignore alterations to the kernels and/or modules responsive to the host 120 setting an immutability flag. After the immutability flag has been set, the hardware module 130 may consider any change to the kernel, modules, or loaded modules to be a security violation. When the immutability flag is set, the hardware module may automatically compute the hashes of the current contents loaded into the kernel. These hashes may be used as golden hashes when operating in the second mode. The flag set by the immutability request may be cleared only by a host reboot or other action by which the host's 120 CPU execution is restarted from initial conditions. Therefore, if the hardware module 130 determines that a loaded module onto the kernel has mutated the kernel after the immutability flag has been set, the hardware 130 module may flag a security violation.

Figure 2:
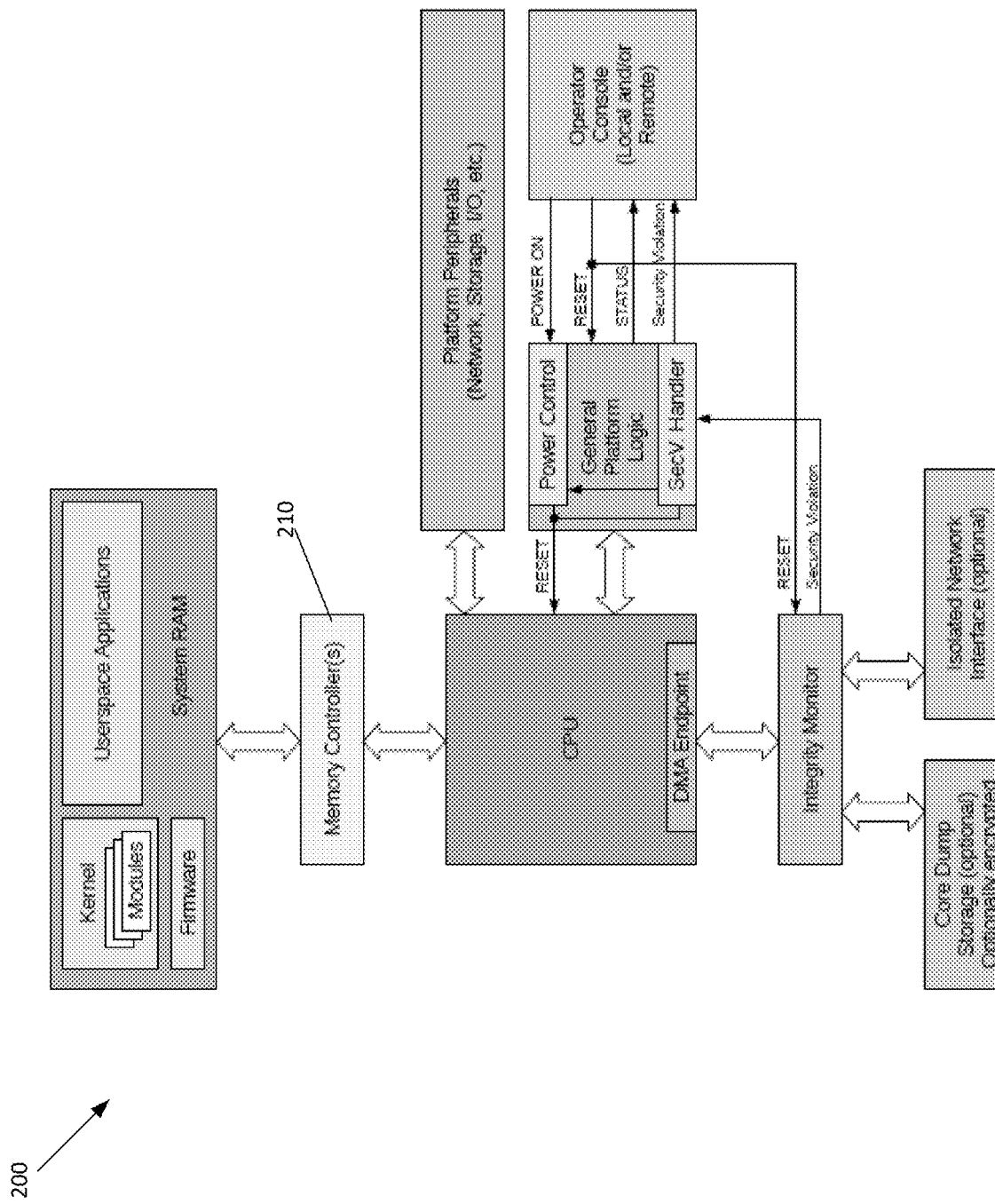
FIG. 2 depicts a topology for a system configured to ensure the integrity of an operating system and related critical software components at runtime, according to an embodiment.

FIG. 2 depicts a topology for a system 200 configured to ensure the integrity of an operating system and related critical software components at runtime, according to an embodiment. Elements depicted in FIG. 2 may be described above. For the sake of brevity an additional description of these items is omitted.

As depicted in FIG. 2, memory controller 210 may be a separate and independent hardware element from host 120. Memory controller 210 may be a digital circuit that is configured to manage the flow of data going to and from host's main memory and critical applications 110. Memory controller 210 may be configured to receive data from host 120, which may be utilized to initiate critical applications 110 stored on system RAM. Additionally, memory controller 210 may be configured to receive data associated with critical applications 110 executed on system RAM, such as signatures, key pairs, and addresses associated with modules loaded into the kernel. Memory controller 210 may forward this received data to host 120.

Figure 3:
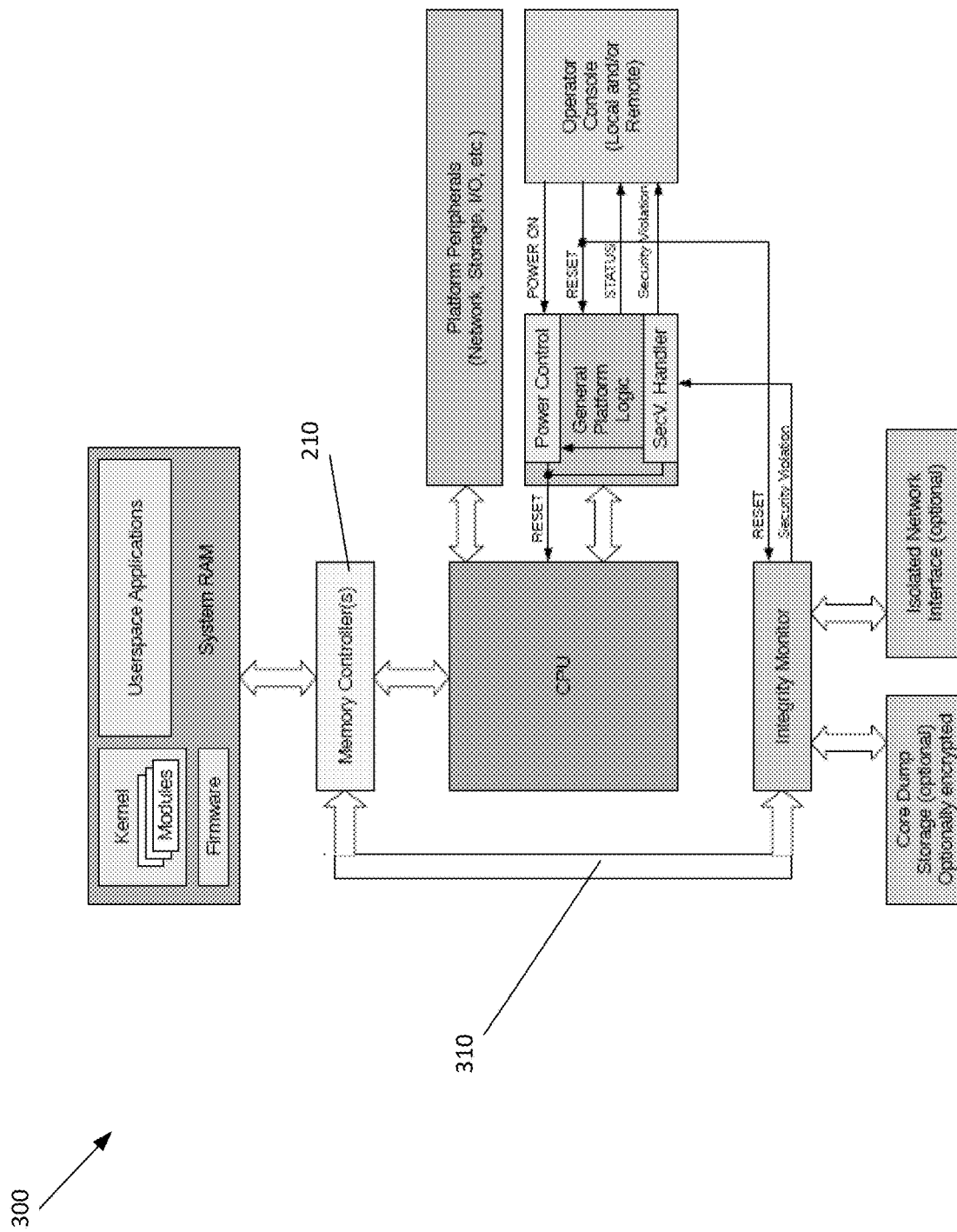
FIG. 3 depicts a topology for a system configured to ensure the integrity of an operating system and related critical software components at runtime, according to an embodiment.

FIG. 3 depicts a topology for a system 300 configured to ensure the integrity of an operating system and related critical software components at runtime, according to an embodiment. Elements depicted in FIG. 3 may be described above. For the sake of brevity an additional description of these items is omitted.

Figure 4:
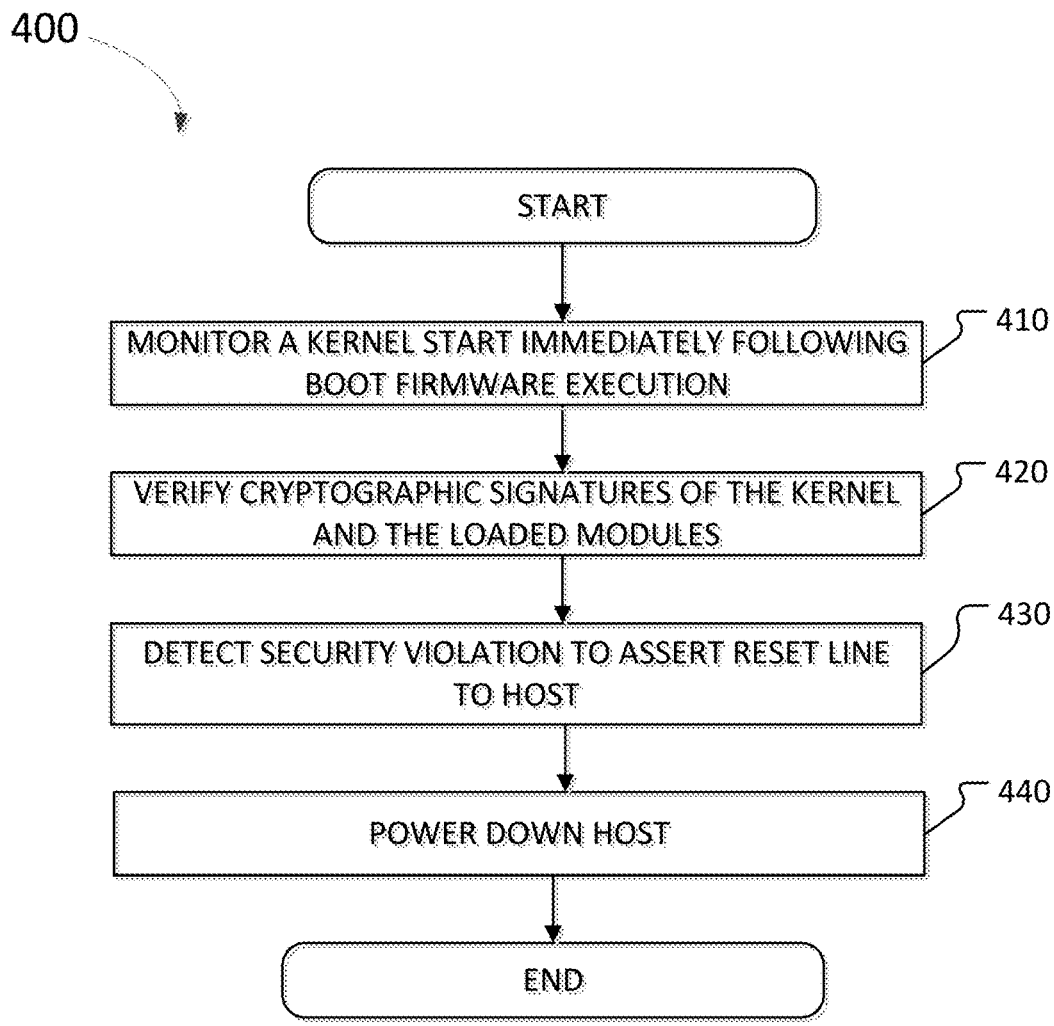
FIG. 4 depicts a method for assuring of an operating system and related critical software components at runtime, according to an embodiment.

As depicted in FIG. 3, memory controller 210 may be configured to directly communicate with hardware module 130 via a communications channel 130. Communications channel 130 may enable hardware module 130 to receive the data associated with modules loaded into the kernel, such as signatures, key pairs, and addresses more quickly and efficiently. Hardware module 130 may also be configured to receive other data associated with executed critical applications 110 over communications channel 130, such as key pairs, signatures, addresses associated with firmware and userspace applications, and executable data associated with firmware and userspace applications FIG. 4 illustrates a method 400 for assuring of an operating system and related critical software components at runtime, according to an embodiment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a solid-state machine, reconfigurable logic, fixed logic, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 410, a hardware module may monitor a kernel start immediately following boot firmware execution. While monitoring the kernel start, the hardware module may track any and all modules, such as drivers, being loaded into the kernel along with the signing keys of both the kernel and the modules. In embodiments, the kernel may be stored in and considered part of the platform boot firmware, in which case boot firmware refers to the stages prior to loading and execution of this kernel.

At operation 420, at runtime the hardware module may scan data at known module addresses in host's memory to verify that the cryptographic signatures of the kernel and the loaded modules are valid. This may determine if any mutation to the kernel or modules in RAM have occurred. Furthermore, after load, the hardware module may implement a collision-resistant hashing algorithm to verify that the host's memory has not changed.

At operation 430, upon detecting a security violation, the hardware module may transmit data to assert a reset line to the host. The reset line may be held until the security violation is expressively acknowledged by a system operator.

At operation 440, the host may power down. To this end, zero-day attacks may be nearly impossible because they typically rely on modification of running programs, kernels, or kernel modules on the host system. However, by requiring continuous verification of the cryptographic signatures and loaded modules at runtime, the system may be shut down before appreciable amounts of data can be manipulated or extracted.

In further implementations, the hardware module may additionally monitor userspace processes and applications signatures in a similar manner to those discussed in FIG. 4. However, the hardware module may be configured to provide four flags. A first flag may be set a security violation if any new processes of any type are spawned, and a second flag may set a security violation if a new program is spawned, such as a new program that does not match the hash of an already executing program is spawned. A third flag may set a security violation if a new process is spawned that is not on module 130's whitelist, and the fourth may set a userspace immutability request, where a security violation will be set if the executable data of any monitored userspace process is altered.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable content may be utilized. For example, a computer-readable medium may include one or more of a portable computer diskette, a hard disk, a random access memory (RAM, DRAM, Flash, MRAM, etc.) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A system configured to ensure an integrity of an operating system and software components at runtime, the system comprising:
    critical applications including system data, wherein the system data is associated with platform boot firmware that occurs prior to loading and executing a kernel;
    a host computing processing system configured to load the system data within system RAM, the system data being associated with an operating system of the host computing processing system;
    an external hardware module being configured to monitor the system data before the system data is loaded into the host computing device, and the external hardware module is configured to automatically store validity data in persistent memory of the external hardware module before the system data is loaded into the host computing device responsive to the monitoring of the system data without being remotely modified by the host, wherein the validity data is associated with the system data, and the external hardware module being configured to determine at runtime when there is a security violation based on mutations to the system data by comparing the validity data stored on the external hardware module with the loaded system data on the host computing processing system, wherein the external hardware module is located remotely from the host computing processing system;
    general platform logic that is configured to communicate with the host computing processing system, the external hardware module, and an operator console, the general platform logic being a control bus,
    a first reset line from the general platform logic to the host computing processing system;
    a second reset line from the general platform logic to the external hardware module;
    wherein responsive to the external hardware module determining a security violation the general platform logic asserts the first reset line for the host computing processing system, and to clear the security violation the operator console is configured to transfer reset data over the second reset line to the external hardware module, wherein the external hardware module is externally located from the host computing processing system.

2. The system of claim 1, wherein the system data is associated with a driver, kernel, or userspace executable.

3. The system of claim 1, wherein the external hardware module is configured to determine a cryptographic signature associated with the system data is valid by comparing a public key associated with the cryptographic signature with a stored public key, wherein the stored public key is associated with the validity data, wherein the cryptographic signature is valid when there are no mutations to the system data.

4. The system of claim 1, wherein the validity data includes at least one of stored cryptographic signatures or collision-resistant hashes.

5. The system of claim 1, wherein the validity data includes at least one of key pair data, hash data, and signature data.

6. The system of claim 1, wherein the host computing processing system includes a memory device with addresses corresponding to different areas of the memory device, and the external hardware module is configured to only scan addresses associated with the system data.

7. The system of claim 1, further comprising:
    a plurality of host computing processing systems, wherein the external hardware module is coupled to the plurality of host computing processing systems.

8. The system of claim 1, wherein the external hardware module is located remotely from the host computing processing system, and the external hardware module communicates with the host computing processing system via a direct memory access endpoint.

9. The system of claim 1, wherein the external hardware module is configured to determine golden hashes based on a kernel or a userspace process loaded into memory after an immutability flag has been set, wherein the golden hashes are utilized to determine mutations to the kernel or the userspace process.

* * * * *